(12) United States Patent
Shabara et al.

(10) Patent No.: US 12,719,543 B2
(45) Date of Patent: Aug. 25, 2026

(54) METHOD AND APPARATUS FOR CHANNEL STATE INFORMATION REPORTING

(71) Applicant: MediaTek Singapore Pte. Ltd., Singapore (SG)

(72) Inventors: Yahia Ahmed Mahmoud Mahmoud Shabara, San Jose, CA (US); Gyu Bum Kyung, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 292 days.

(21) Appl. No.: 18/684,805

(22) PCT Filed: Jan. 6, 2023

(86) PCT No.: PCT/US2023/060200
§ 371 (c)(1),
(2) Date: Feb. 19, 2024

(87) PCT Pub. No.: WO2023/137244
PCT Pub. Date: Jul. 20, 2023

(65) Prior Publication Data

US 2024/0348306 A1 Oct. 17, 2024

Related U.S. Application Data

(60) Provisional application No. 63/300,076, filed on Jan. 17, 2022.

(51) Int. Cl.
*H04B 7/06* (2006.01)

(52) U.S. Cl.
CPC ......... *H04B 7/0626* (2013.01); *H04B 7/0663* (2013.01)

(58) Field of Classification Search
None
See application file for complete search history.

(56) References Cited

U.S. PATENT DOCUMENTS 10,348,380 B1 7/2019 Qi et al.
2013/0163645 A1* 6/2013 Kuo .................... H04B 7/0478 375/267

(Continued)

FOREIGN PATENT DOCUMENTS

CN 113938952 A 1/2022
WO 2020/180221 A1 9/2020

OTHER PUBLICATIONS

International Search Report and Written Opinion dated Jun. 15, 2023, issued in application No. PCT/US2023/060200.

(Continued)

*Primary Examiner* — Benjamin Lamont
(74) *Attorney, Agent, or Firm* — McClure, Qualey & Rodack, LLP

(57) ABSTRACT

Aspects of the disclosure provide a method, an apparatus, and a non-transitory computer-readable medium for compressing channel state information (CSI). Under the method, a CSI matrix is decomposed, at a first device, into a first vector including a plurality of significant numbers extracted from the CSI matrix. A second vector is generated by multiplying the first vector with a linear operator. A length of the second vector is less than a length of the first vector. The second vector is sent from the first device to a second device along with a number of the plurality of significant numbers in the first vector. The method is implemented in software instructions, and when processing circuitry of the apparatus executes the software instructions, the processing circuitry of the apparatus performs the method. The software instructions are stored in the non-transitory computer-readable medium.

20 Claims, 10 Drawing Sheets

(56) References Cited

U.S. PATENT DOCUMENTS

| | | | | |
|---|---|---|---|---|
| 2017/0126437 | A1* | 5/2017 | Truong | H04B 7/0626 |
| 2018/0013590 | A1* | 1/2018 | Venkateswaran | H04B 7/0868 |
| 2019/0312623 | A1 | 10/2019 | Park | |
| 2020/0186224 | A1* | 6/2020 | Ahmed Salem | H04L 1/1614 |
| 2020/0204229 | A1 | 6/2020 | Jin | |
| 2021/0376887 | A1 | 12/2021 | Wu | |
| 2022/0149904 | A1* | 5/2022 | Timo | H04L 1/0026 |
| 2022/0376749 | A1* | 11/2022 | Timo | H04B 7/0452 |
| 2022/0394723 | A1* | 12/2022 | Gao | H04W 72/0453 |

OTHER PUBLICATIONS

Chinese language office action dated Sep. 6, 2023, issued in application No. TW 112101673.

* cited by examiner

METHOD AND APPARATUS FOR CHANNEL STATE INFORMATION REPORTING

INCORPORATION BY REFERENCE

This present disclosure claims the benefit of U.S. Provisional Application No. 63/300,076, filed on Jan. 17, 2022, which is incorporated herein by reference in its entirety.

TECHNICAL FIELD

The present disclosure relates to wireless communications, and specifically to a procedure for compressing channel state information between a transmitter and a receiver.

BACKGROUND

In wireless communications, channel state information (CSI) can estimate channel properties of a communication link between a transmitter and a receiver. In related arts, the receiver can estimate the CSI of the communication link and selects a best transmit precoder from a predefined codebook of precoders based on the estimated CSI. Further, the receiver can feed information related to the selected best transmit precoder back to the transmitter. This procedure can consume a great deal of communication resources and place a tremendous strain on a wireless network using modern multiple-input and multiple-output (MIMO) technology.

SUMMARY

Aspects of the disclosure provide a method of compressing channel state information (CSI). Under the method, a CSI matrix is decomposed, at a first device, into a first vector including a plurality of significant numbers extracted from the CSI matrix. A second vector is generated by multiplying the first vector with a linear operator. A length of the second vector is less than a length of the first vector. The second vector is sent from the first device to a second device along with a number of the plurality of significant numbers in the first vector.

In an embodiment, the first vector includes multiple first sub-vectors. Each of the multiple first sub-vectors is multiplied with one of multiple linear operators to obtain a corresponding second sub-vector. Each of the multiple first sub-vectors includes a different subset of the plurality of significant numbers in the first vector. Each second sub-vector and a number of the corresponding subset of the plurality of significant numbers in the first vector are sent to the second device.

In an embodiment, a length of each of the multiple first sub-vectors is greater than a length of the second sub-vector generated based on the respective first sub-vector.

In an embodiment, the first vector includes multiple first sub-vectors. A subset of the multiple first sub-vectors is selected. Each of the subset of the multiple first sub-vectors is multiplied with one of multiple linear operators to obtain a corresponding second sub-vector. Each of the subset of the multiple first sub-vectors includes a different subset of the plurality of significant numbers in the first vector. Each second sub-vector and a number of the corresponding subset of the plurality of significant numbers in the first vector are sent to the second device.

In an embodiment, a number of the significant numbers in each of the selected subset of the multiple first sub-vectors is equal to each other.

In an embodiment, the linear operator is determined based on the number of the plurality of significant numbers extracted from the CSI matrix.

In an embodiment, the linear operator is a binary party check matrix or a linear block code (LBC).

In an embodiment, a length of the first vector is predetermined.

Aspects of the disclosure provide an apparatus including processing circuitry that decomposes a CSI matrix into a first vector including a plurality of significant numbers extracted from the CSI matrix. The processing circuitry generates a second vector by multiplying the first vector with a linear operator. A length of the second vector is less than a length of the first vector. The processing circuitry sends the second vector to a second apparatus along with a number of the plurality of significant numbers in the first vector.

Aspects of the disclosure further provide a non-transitory computer-readable medium storing a program implementing the above method.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
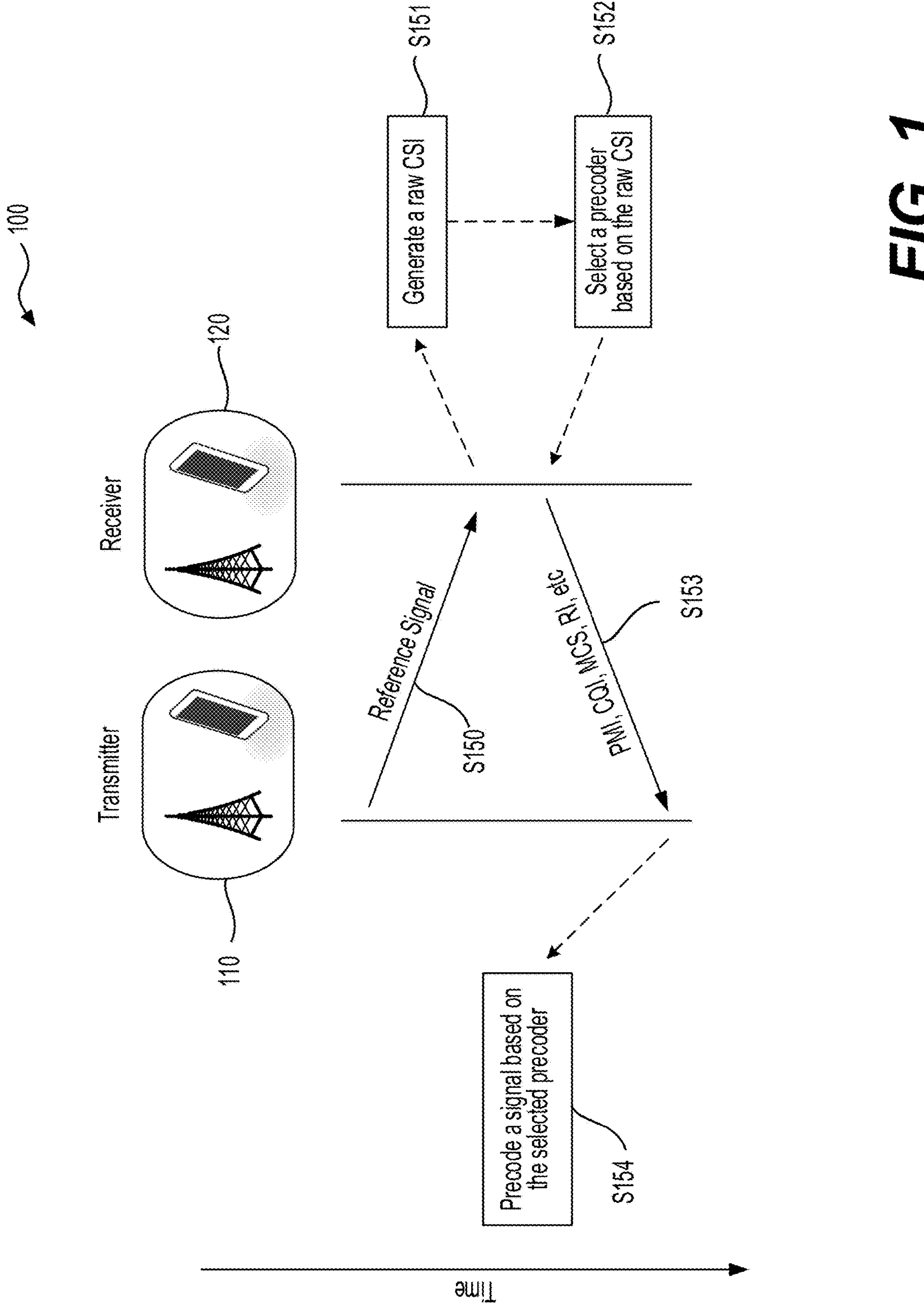
FIG. 1 shows an exemplary procedure of CSI reporting according to embodiments of the disclosure.

The detailed description set forth below in connection with the appended drawings is intended as a description of various configurations and is not intended to represent the only configurations in which the concepts described herein may be practiced. The detailed description includes specific details for the purpose of providing an understanding of various concepts. However, these concepts may be practiced without these specific details.

Several aspects of telecommunication systems will now be presented with reference to various apparatuses and methods. These apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Channel state information (CSI) can estimate channel properties of a communication link between a transmitter and a receiver in wireless communications. For example, CSI can describe how a signal propagates from the transmitter to the receiver, and represent a combined effect of phenomena such as scattering, fading, power loss with distance, and the like. Thus, CSI can also be referred to as channel estimation. CSI can make it feasible to adapt the transmission between the transmitter and the receiver to current channel conditions, and thus is a critical piece of information that needs to be shared between the transmitter and the receiver to allow high-quality signal reception.

In related arts, the receiver can estimate the CSI of the communication link and select a best transmit precoder from a predefined codebook of precoders based on the estimated CSI. Further, the receiver can feed information related to the selected best transmit precoder back to the transmitter. This procedure consumes a great deal of communication resources and places a tremendous strain on a wireless network using modern multiple-input and multiple-output (MIMO) technology.

For example, it is assumed that there are n and m antennas at the transmitter and the receiver, respectively. If a data size of a CSI is K in a single-input single-output (SISO) condition, the data size of the CSI can be n×m×K in a MIMO condition. In addition, each receiver needs to continuously update the CSI, for example, in a millisecond level interval, which may cause a high pressure on the network.

Although the transmitter requires CSI knowledge to precode its signal, a feedback of a raw CSI can necessitate a significant overhead and is typically avoided. Instead, based on the raw CSI, the receiver can select a best transmit precoder from a predefined codebook of precoders, and feeds Precoder Matrix Indicator (PMI) of the best transmit precoder back to the transmitter, along with relevant information such as Channel Quality Indicator (CQI), Rank Indicator (RI), Modulation and Coding Scheme (MCS), and the like.

FIG. 1 shows an exemplary procedure 100 of CSI reporting according to embodiments of the disclosure. In the procedure 100, each of a transmitter 110 and a receiver 120 can be a user equipment (UE) or a base station (BS).

At step S150, the transmitter 110 transmits a reference signal (RS) to the receiver 120. The RS is also known to the receiver 120 before the receiver 120 receives the RS. In an embodiment, the RS can be specifically intended to be used by devices to acquire CSI and thus is referred to as CSI-RS.

At step S151, after receiving the CSI-RS, the receiver 120 can generate a raw CSI by comparing the received CSI-RS with the transmitted CSI-RS that is already known to the receiver 120.

At step S152, the receiver 120 can select a best transmit precoder from a predefined codebook of precoders based on the raw CSI.

At step S153, the receiver 120 can send a PMI of the selected precoder back to the transmitter 110, along with relevant information such as CQI, RI, MCS, and the like.

At step S154, after receiving the PMI and the relevant information, the transmitter 110 can determine transmission parameters and precode a signal based on the selected precoder indicated by the PMI.

It is noted that a choice of the precoders is restricted to the predefined codebook in the procedure 100. However, restricting the choice of the precoders to the predefined codebook can limit the achievable system performance. Different precoder codebooks (e.g., 3GPP NR downlink Type I-Single Panel/Multi-Panel, Type II, eType II, or uplink codebook) have different preset feedback overheads. If the network specifies a preset codebook before the raw CSI is estimated at the receiver, the receiver is not able to further optimize the codebook selection based on tradeoffs between the feedback overhead and the system performance.

Aspects of this disclosure provide methods and embodiments to feedback a compressed version of a raw CSI to a transmitter. Based on the compressed CSI, the transmitter is able to optimally compute a precoder for precoding a transmitting signal, and also optimally decide on other transmission parameters such as rank, MCS, and the like. Further, a compression ratio used in compressing the raw CSI can be decided dynamically after the raw CSI has been estimated, in order to allow an optimal tradeoff between the feedback overhead and the system performance.

Figure 2:
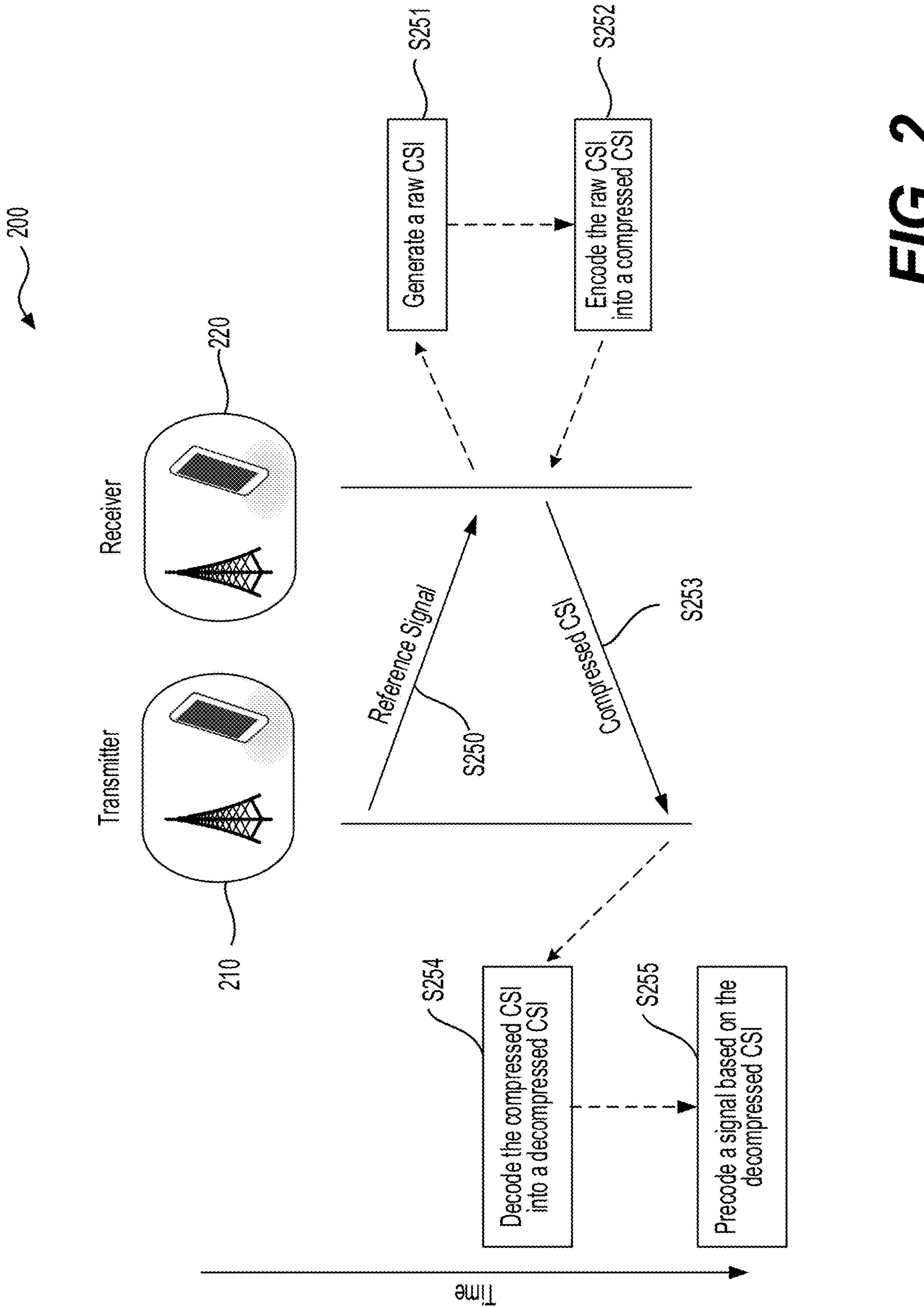
FIG. 2 shows another exemplary procedure of CSI reporting according to embodiments of the disclosure.

FIG. 2 shows an exemplary procedure 200 of CSI reporting according to embodiments of the disclosure. In the procedure 200, each of a transmitter 210 and a receiver 220 can be a user equipment (UE) or a base station (BS), and steps S250 and S251 are similar to steps S150 and S151 in the procedure 100 of FIG. 1, respectively.

At step S252, the receiver 220 can encode (or compress) the raw CSI into a compressed CSI.

At step S253, the receiver 220 can send the compressed CSI back to the transmitter 210.

At step S254, the transmitter 210 can decode (or decompress) the compressed CSI into a decompressed CSI.

At step S255, the transmitter 210 can determine transmission parameters and precode a signal based on the decompressed CSI.

According aspects of the disclosure, a CSI can be represented as a matrix H in Beam and Delay-Taps domains with a size $N_B \times N_D$, where $N_B$ is a number of transmit-receive (TX-RX) beams and $N_D$ is a number of delay taps. It is noted that the CSI matrix H can be represented in a complex coordinate space $\mathbb{C}^{N_B \times N_D}$, in which every component in the CSI matrix H can be a complex number. In the Beam and Delay-Taps domains, the CSI matrix H is usually sparse. That is, most components of the CSI matrix H are 0s or very small values around 0. This sparsity makes it feasible to compress the CSI matrix H using a simple and cost-effective linear compression algorithm.

In the methods or embodiments of this disclosure, the CSI matrix H can be represented using a k-sparse CSI vector $h_k$ with a length n. A "k-sparse" vector means that this vector only contains k significant (or large) components, while the remaining components are very small or zero values. The receiver then encodes (compresses) the k-sparse CSI vector using a linear operator $M_k$ (i.e., using a matrix multiplication), and obtains a compressed CSI vector $s_k$ with a length m, where m<n. The linear operators $M_k$ for all possible values of k are predetermined. The receiver feeds back the compressed m-dimensional CSI vector $s_k$ to the transmitter along with a value of k. A value of n is high-level information that is also known to the transmitter. Accordingly, once the transmitter obtains the values of k and $s_k$, the transmitter can perform a low-complexity decoding of $s_k$ (e.g., using a machine learning based algorithms or other alternatives) and find an estimated k-sparse CSI vector $\hat{h}_k$ of the k-sparse CSI vector $h_k$ based on the decoding of $s_k$.

It is noted that CSI can also be a tensor representation and does not have to be limited to vector representations. Vectors are used for simplicity in this disclosure. In addition, the value of k can be dynamically chosen by the receiver to optimize the tradeoff between the compression and the system performance.

Figure 3:
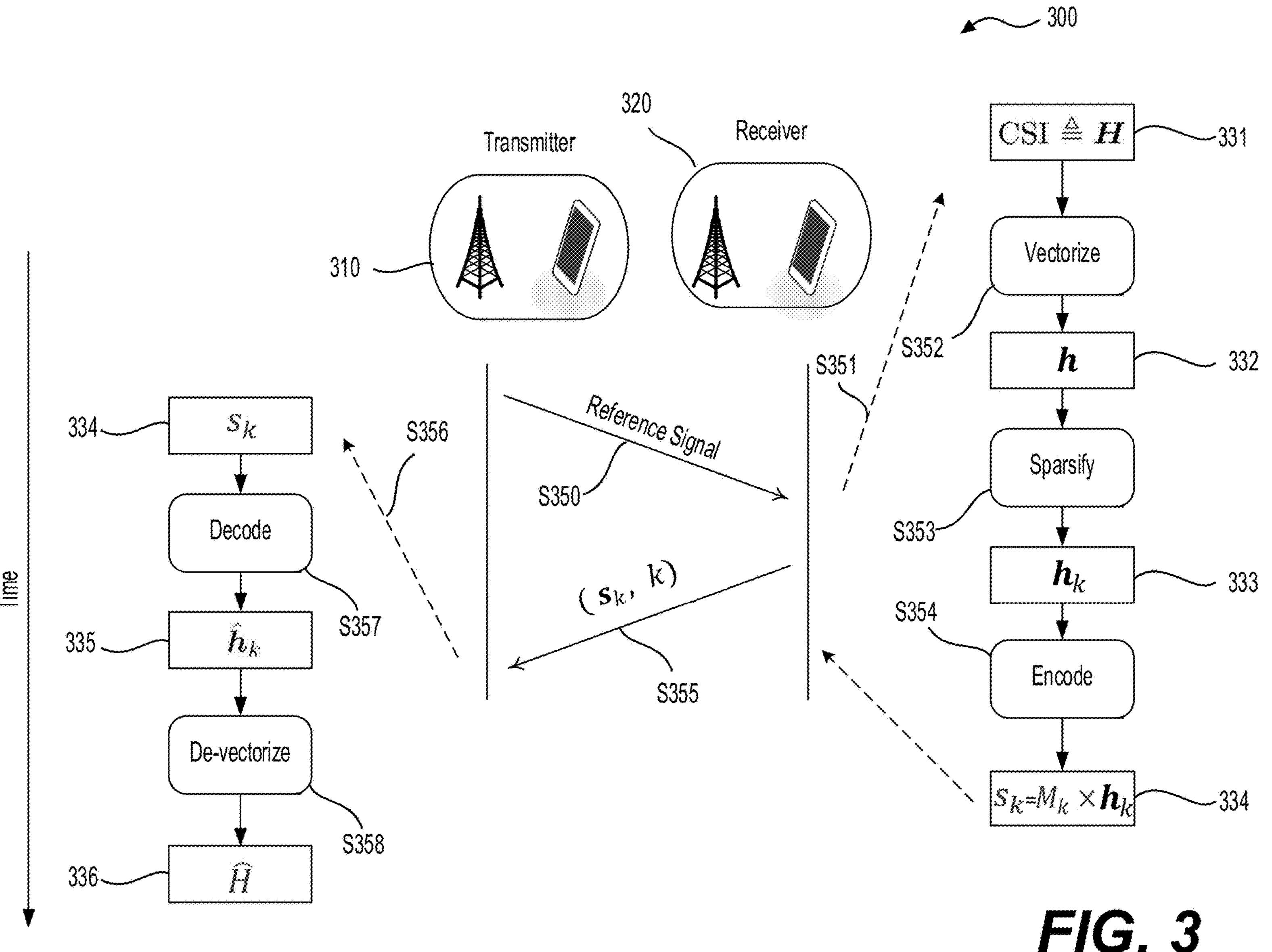
FIG. 3 shows another exemplary procedure of CSI reporting according to embodiments of the disclosure.

FIG. 3 shows an exemplary procedure 300 of CSI reporting according to embodiments of the disclosure. In the procedure 300, each of a transmitter 310 and a receiver 320 can be a user equipment (UE) or a base station (BS).

At step S350, the transmitter 310 can send a CSI-RS to the receiver 320.

At step S351, the receiver 320 can obtain a CSI matrix H 331 by analyzing the received CSI-RS.

At step S352, the receiver 320 can vectorize the CSI matrix H 331 with a size $N_B \times N_D$ into a CSI vector h 332 with a size $n \times 1$, where $n=N_B \times N_D$. For example, the receiver 320 can perform a vectorization of the CSI matrix H 331 by stacking columns of the CSI matrix H 331 on top of each other.

At step S353, the receiver 320 can transform the CSI vector h 332 into a k-sparse vector $h_k$ 333 which includes k most significant (or large) components while the remaining components are very small or zero values. A number of the most significant components k can be referred to as a sparsity index of the k-sparse vector $h_k$ 333. For example, the receiver 320 can select the strongest non-zero components in the k-sparse vector $h_k$ 333, and eliminates all the smaller values by setting them to zero, such that $\lambda h_k\|_0=k$.

At step S354, the receiver 320 can encode (compress) the k-sparse CSI vector $h_k$ 333 into a compressed CSI vector $s_k$ 334 by multiplying the k-sparse CSI vector $h_k$ 333 with a linear operator $M_k$ which is a matrix with a size n×m. That is, $s_k=M_k \times h_k$. It is noted that the compressed CSI vector $s_k$ 334 has a size m×1. Since m is less than n, the CSI matrix H 331 is compressed.

At step S355, the receiver 320 can send the compressed CSI vector $s_k$ 334 and the sparsity index k back to the transmitter 310.

At step S356, the transmitter 310 can receive the compressed CSI vector $s_k$ 334 and the sparsity index k.

At step S357, the transmitter 310 can determine a decoder to decompress the compressed CSI vector $s_k$ 334 into a decompressed CSI vector $\hat{h}_k$ 335. The "hat" symbol over $\hat{h}_k$ 335 indicates the decompressed CSI vector $\hat{h}_k$ 335 is an estimate of the k-sparse vector $h_k$ 333.

At step S358, the transmitter 310 can de-vectorize the decompressed CSI vector $\hat{h}_k$ 335 into a decompressed CSI matrix $\hat{H}$ 336. Based on the decompressed CSI matrix $\hat{H}$ 336, the transmitter 310 can determine transmission parameters and precode a signal.

In an embodiment, a criteria to select a value of k is based on the tradeoff between the feedback overhead and the system performance. A larger value of k can preserve more information from the raw CSI matrix H 331 but may consume more computation power and channel resource. A length n of the CSI vector h 332 is high-level information already known to the transmitter 310.

In an embodiment, the linear operator $M_k$ can be implemented as a matrix that can be randomly generated or can be a binary parity check matrix of a Linear Block Code (LBC).

This LBC must be capable of correcting a number k of errors in blocks of data of a length n. The component values of the matrix $M_k$ can be determined based on the sparsity index k and the length n of the CSI vector h 332. The linear operator $M_k$ can be predefined before step S350. The receiver 320 can choose a corresponding matrix for the linear operator $M_k$ to compress the k-sparse vector $h_k$ 333 based on the sparsity index k and the length n of the CSI vector h 332.

In an embodiment, various machine learning algorithms such as Deep Neural Networks (DNN) and Convolutional Neural Networks (CNN) can be implemented in the decoder to decompress the compressed CSI vector $s_k$ 334.

According to aspects of the disclosure, a compression of a k-sparse vector $h_k$ can be implemented in multiple steps such as t steps. For example, the k-sparse vector $h_k$ can be represented as a linear summation of sub-vectors $h_{k_i}$. That is, $h_k=$ $$\sum_{i=1}^{t} h_{k_i},$$

where k=

$$\sum_{i=1}^{t} k_i.$$

Each sub-vector $h_{k_i}$ has a length n and a number $k_i$ of significant numbers. For each $k_i$-sparse sub-vector $h_{k_i}$, a linear operator $M_{k_i}$ can be used to generate a corresponding compressed CSI sub-vector $s_{k_i}=M_{k_i}k_i$, $\forall i \in \{1, 2, \ldots, t\}$. A receiver can feedback a number t of the multiple steps and the multiple pairs of $(k_i, s_{k_i})$ to a transmitter. The transmitter, in turn, can decode each pair $(k_i, s_{k_i})$ separately to obtain an estimate $\hat{h}_{k_i}$ of the CSI sub-vector $h_{k_i}$ corresponding to the respective pair of $(k_i, s_{k_i})$. Finally, the transmitter can reconstruct an estimate $\hat{h}_k$ of the k-sparse vector $h_k$ by a linear summation of all $\hat{h}_{k_i}$ as $\hat{h}_k=$ $$\sum_{i=1}^{t} \hat{h}_{k_i}.$$

In an embodiment, the receiver can opt to choose $k_i$ such that $k_i=k_j$, $\forall i \in \{1, 2, \ldots, t\}$ $\forall j \in \{1, 2, \ldots, t\}$. This means that all CSI sub-vectors $h_{k_i}$ have the same number of significant numbers, so that all linear operators $M_{k_i}$ used for compression can be identical. Hence, the decoders for decompression can also be identical. This can significantly reduce the complexity of the decoders on the transmitter side. Using a multi-step compression, the accuracy of CSI representation can be incrementally increased with each pair of $(k_i, s_{k_i})$ being feedback to the transmitter.

FIG. 4A-4D show an exemplary procedure 400 of CSI reporting according to embodiments of the disclosure. In the procedure 400, each of a transmitter 410 and a receiver 420 can be a user equipment (UE) or a base station (BS). Steps S450-S453 can be similar to steps S350-S353 in the procedure 300, respectively.

Figure 4A:
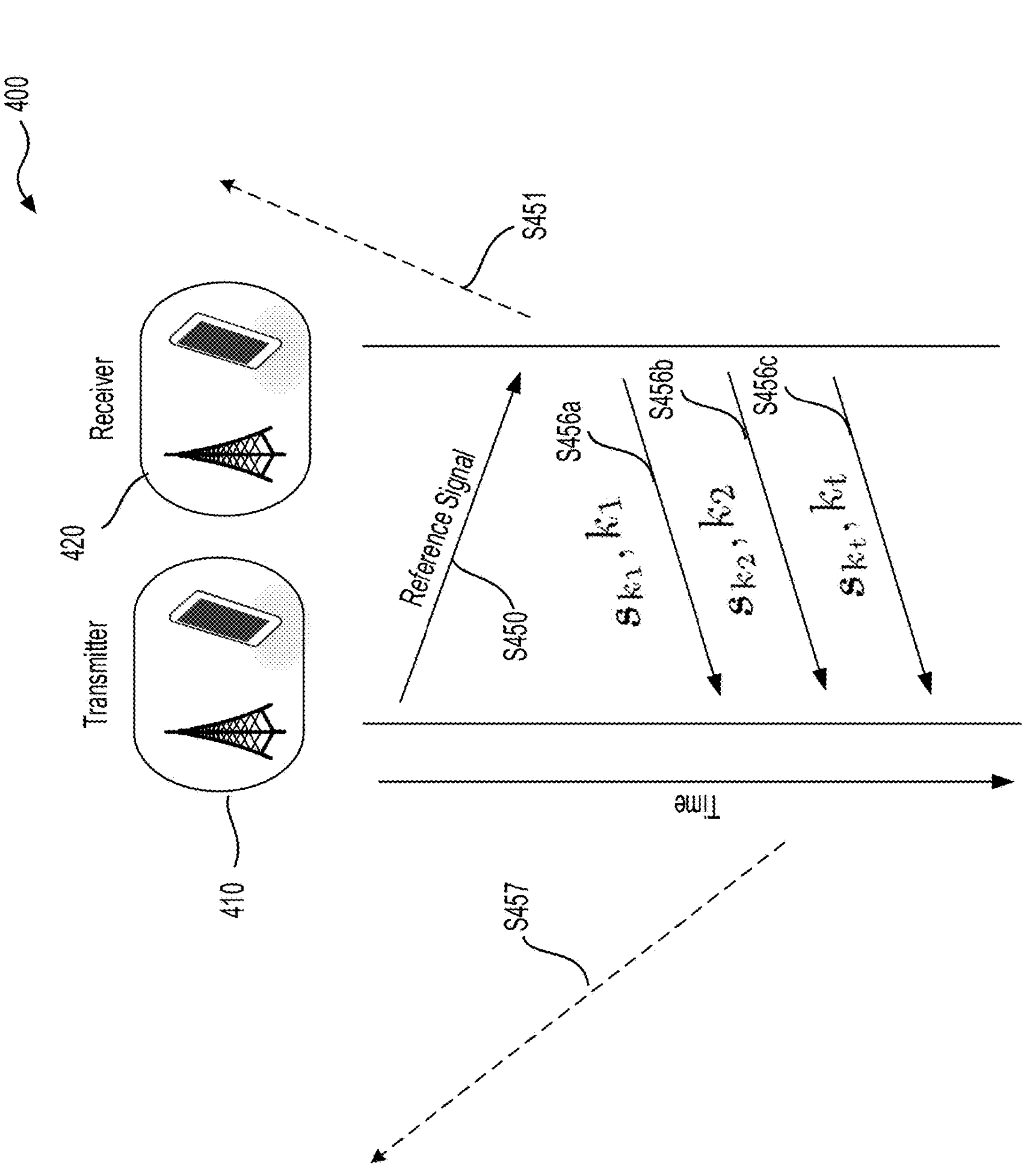
FIG. 4A-4D show another exemplary procedure of CSI reporting according to embodiments of the disclosure.
Figure 4B:
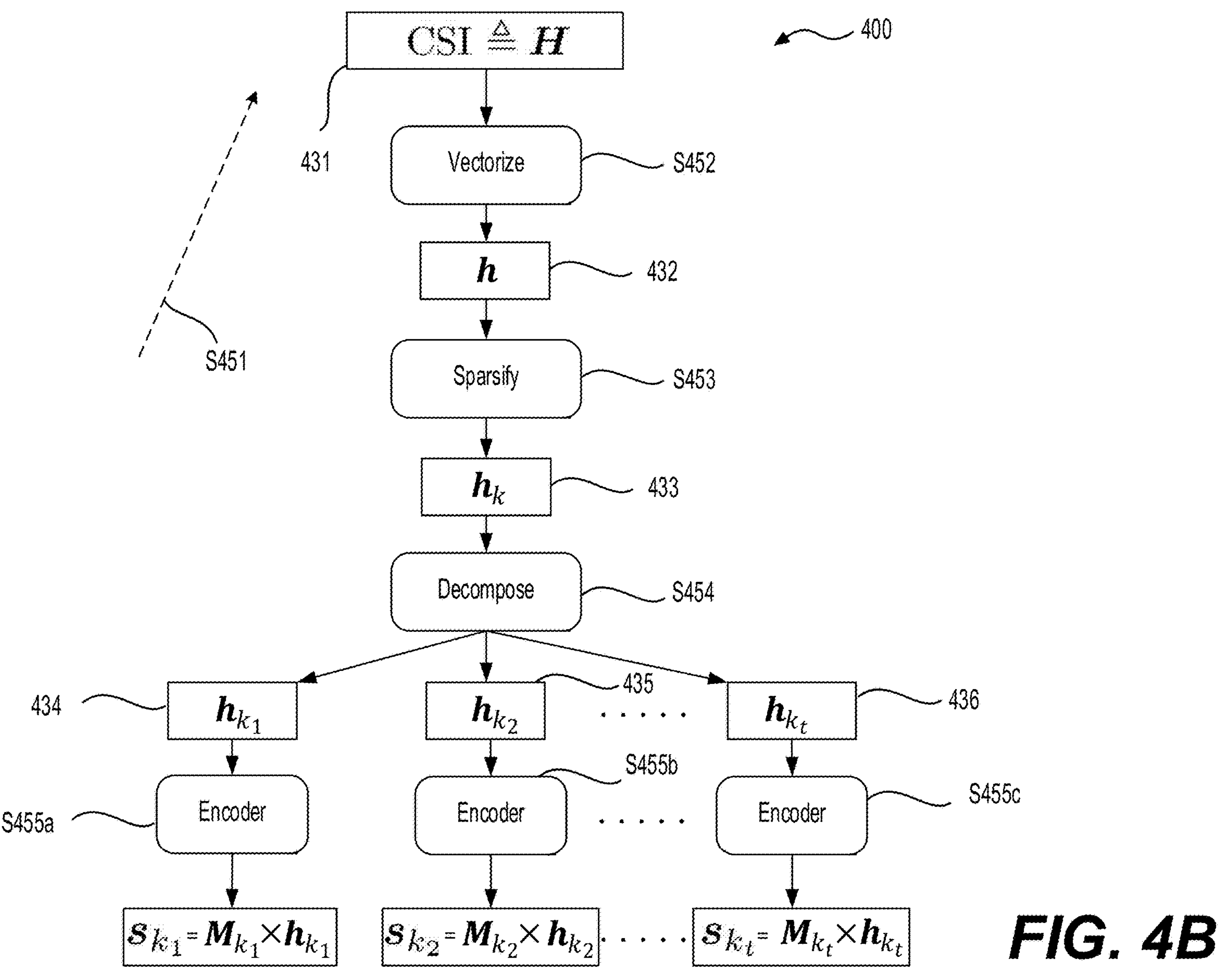

At step S454 (as shown in FIG. 4B), the receiver 420 can decompose the k-sparse CSI vector $h_k$ 433 into a number t of CSI sub-vectors $h_{k_1}$ 434, $h_{k_2}$ 435, . . . , $h_{k_t}$ 436, given by $h_k=$ $$\sum_{i=1}^{t} h_{k_i},$$

where k=

$$\sum_{i=1}^{t} k_i.$$

Each sub-vector $h_{k_1}$ is a $k_i$-sparse vector with the same length n as the k-sparse CSI vector $h_k$ 433.

At steps S455a-S455c (as shown in FIG. 4B), the receiver 420 can compress each sub-vector $h_{k_i}$ based on a corresponding linear operator $M_{k_i}$, in a similar way as step S354 in the procedure 300. A value of the linear operator $M_{k_i}$ can be determined based on the sparsity index $k_i$ and the length n of the corresponding CSI $k_i$-sparse sub-vector $h_{k_i}$. Accordingly, during each compression, a compressed CSI sub-vector $s_{k_i}$ can be obtained by multiplying $M_{k_i}$ with $h_{k_i}$.

At step S456*a*-S456*c* (as shown in FIG. 4A), the receiver 420 can pair the compressed CSI sub-vectors $s_{k_i}$ with the corresponding sparsity indexes $k_i$ to form multiple pairs of $(s_{k_i}, k_i)$, and send the multiple pairs to the transmitter 410.

At step S457 (as shown in FIG. 4A), the transmitter 410 can receive the multiple pairs of $(s_{k_i}, k_i)$.

Figure 4C:
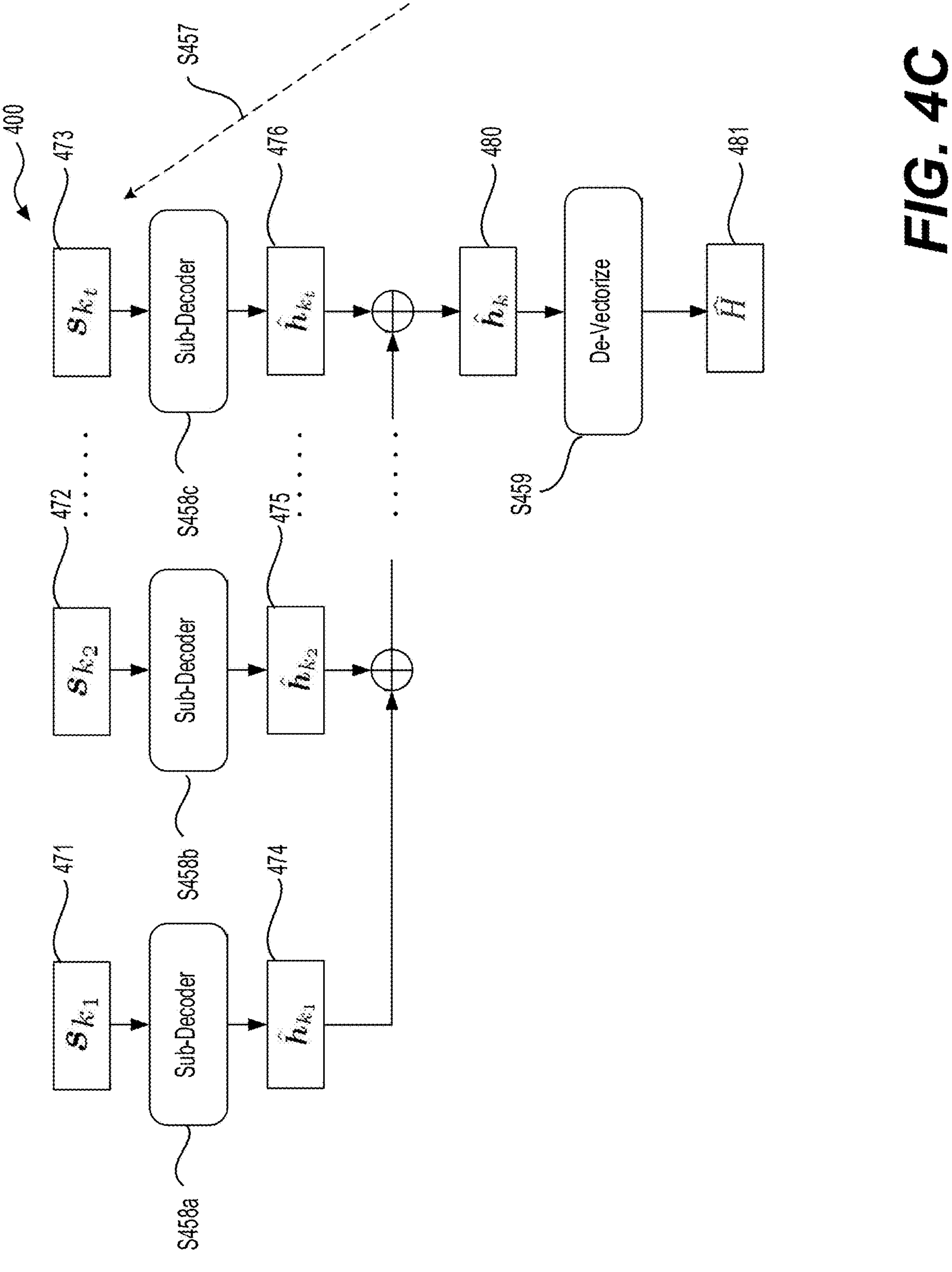

At step S458*a*-S458*c* (as shown in FIG. 4C), the transmitter 410 can determine multiple sub-decoders to decompress the compressed CSI vectors $s_{k_1}$ 471, $s_{k_2}$ 472, . . . , $s_{k_t}$ 473 into decompressed CSI sub-vectors $\hat{h}_{k_1}$ 474, $\hat{h}_{k_2}$ 475, . . . , $\hat{h}_{k_t}$ 476. Every sub-decoder can be determined by the corresponding sparsity index $k_i$.

In an embodiment, the decompressed CSI sub-vectors $\hat{h}_{k_1}$ 474, $\hat{h}_{k_2}$ 475, . . . , $\hat{h}_{k_t}$ 476 can be incrementally accumulated to obtain a decompressed CSI vector $\hat{h}_k$ 480 as $\hat{h}_k=$ $$\sum_{i=1}^{t} \hat{h}_{k_i}.$$

At step S459 (as shown in FIG. 4C), the transmitter 410 can de-vectorize the decompressed CSI vector $\hat{h}_k$ to obtain a decompressed CSI matrix $\hat{H}$ 481. Based on the decompressed CSI matrix $\hat{H}$ 481, the transmitter 410 can determine transmission parameters and precode a signal.

Figure 4D:
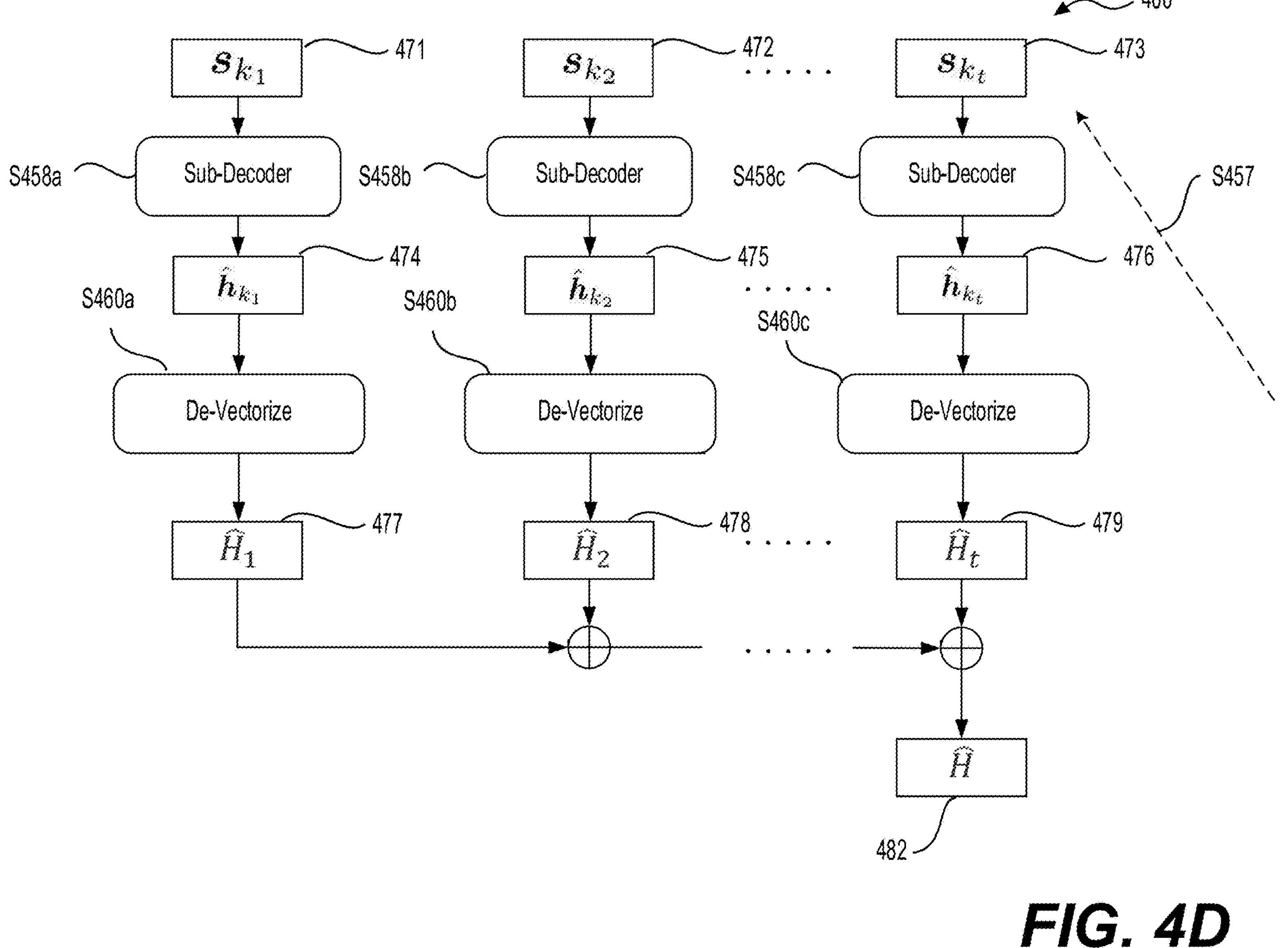

In an embodiment, at steps S460*a*-S460*c* (as shown in FIG. 4D), the transmitter 410 can directly de-vectorize the decompressed CSI sub-vectors $\hat{h}_{k_1}$ 474, $\hat{h}_{k_2}$ 475, . . . , $\hat{h}_{k_t}$ 476 to obtain corresponding decompressed CSI sub-matrix $\hat{H}_1$ 477, $\hat{H}_2$ 478, . . . , $\hat{H}_t$ 479. The decompressed CSI sub-matrixes $\hat{H}_1$ 477, $\hat{H}_2$ 478, . . . , $\hat{H}_t$ 479 can be incrementally accumulated to obtain a decompressed CSI matrix 482 $\hat{H}=$ $$\sum_{i=1}^{t} \hat{H}_i.$$

Based on the decompressed CSI matrix $\hat{H}$ 482, the transmitter 410 can determine transmission parameters and precode a signal.

It is noted that, the decompressed CSH matrixes $\hat{H}$ 481 and 482 can be identical to each other according to embodiments of the disclosure.

In an embodiment, the receiver 420 can send a subset of the compressed CSI vectors $s_{k_1}$ 471, $s_{k_2}$ 472, . . . , $s_{k_t}$ 473 at a single step. The receiver 420 can dynamically adjust a size of the subset based on the tradeoff between the feedback overhead and the system performance. Different subsets can be sent to the transmitter 410 in multiple steps, allowing an incremental CSI reconstruction with an improved CSI accuracy, and mitigating the computation overhead of the decoding on the transmitter side. The incremental CSI reconstruction enables the transmitter 410 to select optimal or close-to-optimal transmission parameters such as precoding matrices, rank selection, MCS selection, and the like.

In an embodiment, during the incremental CSI reconstruction, the transmitter 410 can determine when to cease the accumulation based on tradeoff between the computation load and accuracy. Once the transmitter 410 determines to cease the accumulation, the rest steps can be ignored.

Aspects of the disclosure provide a method for raw CSI compression and feedback that can be used either in an uplink (UL) or a downlink (DL). In the method, a representation of the raw CSI at a receiver can be a sparse vector (or a tensor) that contains multiple significant large values. The receiver can control a level of the CSI sparsity (i.e., a number of non-zero values in the CSI that will be feedback to a transmitter) in order to control the tradeoff between the feedback overhead and the system performance.

The receiver can encode (or compress) the sparse CSI vector, which contains a lot of zeros or small values around zero, using a linear operator (i.e., using a matrix multiplication), and obtains a compressed CSI vector with a smaller size (compared to the original uncompressed CSI). The linear operators for all sparsity levels can be predetermined. The receiver can feedback the compressed CSI vector to the transmitter along with the selected level of sparsity.

The original size of the CSI is high-level information already known to the transmitter. When the transmitter receives the sparsity level and the compressed CSI, the transmitter can perform a low-complexity decoding of the compressed CSI (e.g., using machine learning based algorithms or other alternatives) and obtain an estimate of the original CSI.

It is noted that a "sparse" vector (also matrix or tensor) means that the vector contains a lot of zeros or close-to-zero values, and only a few significant large values. The sparsity level of a vector denotes the number of significant (or non-zero) values the vector contains.

In an embodiment, the compressed CSI feedback can be split into multiple steps where the receiver can feedback multiple pairs each containing a sparsity level and a corresponding compressed CSI value to the transmitter. Then, the transmitter can decode the multiple compressed CSI values into multiple decompressed CSI values and can linearly combine the decompressed CSI values into a complete decompressed CSI to improve an accuracy of CSI decompression.

Benefits of the raw CSI compression and feedback can include but are not limited to providing a simple and cost-effective linear raw CSI compression and allowing a flexible choice of the k-sparse vector representing the raw CSI. The compressed CSI can be decompressed (or decoded) at a transmitter by applying various algorithms including but not limited to machine learning based algorithms. Linear compression can allow dividing the compression and feedback into multiple steps, allowing an incremental CSI construction with an improved CSI accuracy and simplifying the decoding at the transmitter. The transmitter can select optimal or close-to-optimal transmission parameters such as precoding matrices, rank selection, MCS selection, and the like.

Figure 5:
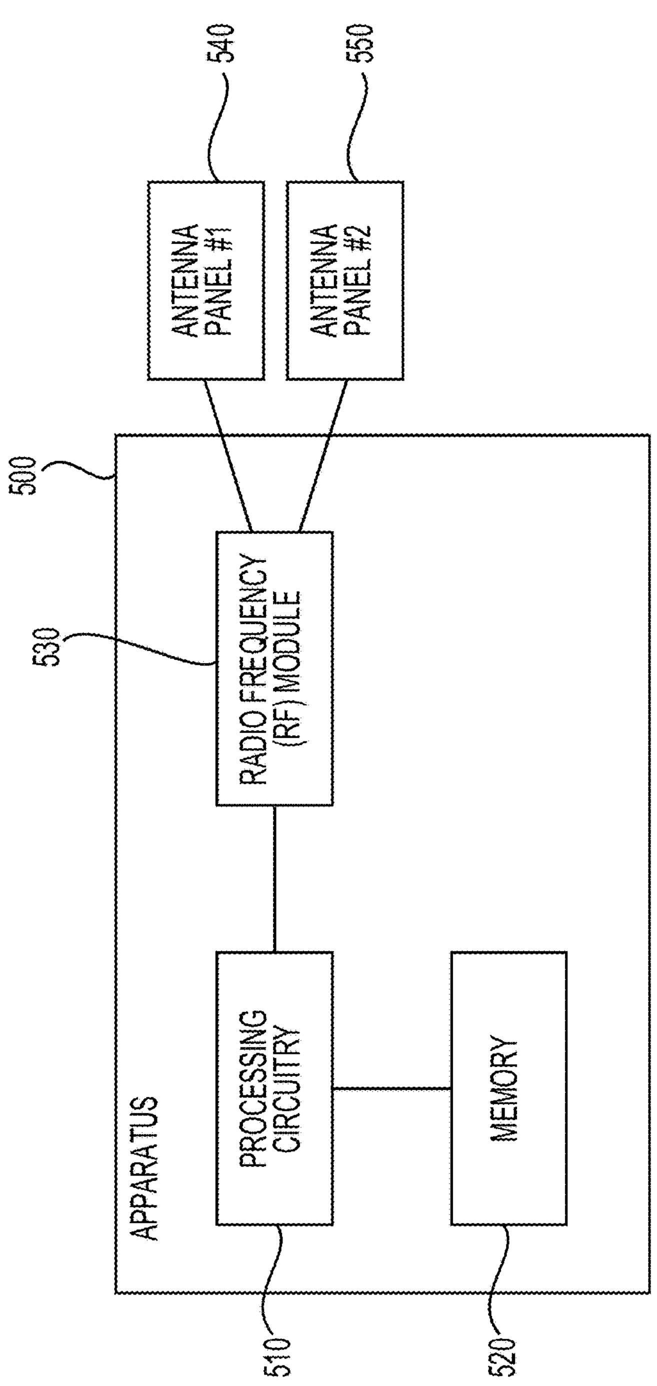
FIG. 5 shows an exemplary apparatus according to embodiments of the disclosure.

FIG. 5 shows an exemplary apparatus 500 according to embodiments of the disclosure. The apparatus 500 can be configured to perform various functions in accordance with one or more embodiments or examples described herein. Thus, the apparatus 500 can provide means for implementation of techniques, processes, functions, components, systems described herein. For example, the apparatus 500 can be used to implement functions of a UE or a base station (BS) (e.g., gNB) in various embodiments and examples described herein. The apparatus 500 can include a general purpose processor or specially designed circuits to implement various functions, components, or processes described herein in various embodiments. The apparatus 500 can include processing circuitry 510, a memory 520, and a radio frequency (RF) module 530.

In various examples, the processing circuitry 510 can include circuitry configured to perform the functions and processes described herein in combination with software or without software. In various examples, the processing circuitry 510 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 510 can be a central processing unit (CPU) configured to execute program instructions to perform various functions and processes described herein. Accordingly, the memory 520 can be configured to store program instructions. The processing circuitry 510, when executing the program instructions, can perform the functions and processes. The memory 520 can further store other programs or data, such as operating systems, application programs, and the like. The memory 520 can include a read only memory (ROM), a random access memory (RAM), a flash memory, a solid state memory, a hard disk drive, an optical disk drive, and the like.

The RF module 530 receives a processed data signal from the processing circuitry 510 and converts the data signal to beamforming wireless signals that are then transmitted via antenna panels 540 and/or 550, or vice versa. The RF module 530 can include a digital to analog convertor (DAC), an analog to digital converter (ADC), a frequency up convertor, a frequency down converter, filters and amplifiers for reception and transmission operations. The RF module 530 can include multi-antenna circuitry for beamforming operations. For example, the multi-antenna circuitry can include an uplink spatial filter circuit, and a downlink spatial filter circuit for shifting analog signal phases or scaling analog signal amplitudes. Each of the antenna panels 540 and 550 can include one or more antenna arrays.

In an embodiment, part of all the antenna panels 540/550 and part or all functions of the RF module 530 are implemented as one or more TRPs (transmission and reception points), and the remaining functions of the apparatus 500 are implemented as a BS. Accordingly, the TRPs can be co-located with such a BS, or can be deployed away from the BS.

The apparatus 500 can optionally include other components, such as input and output devices, additional or signal processing circuitry, and the like. Accordingly, the apparatus 500 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid-state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The techniques described above, can be implemented as computer software using computer-readable instructions and physically stored in one or more computer-readable media. For example, FIG. 6 shows a computer system (600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
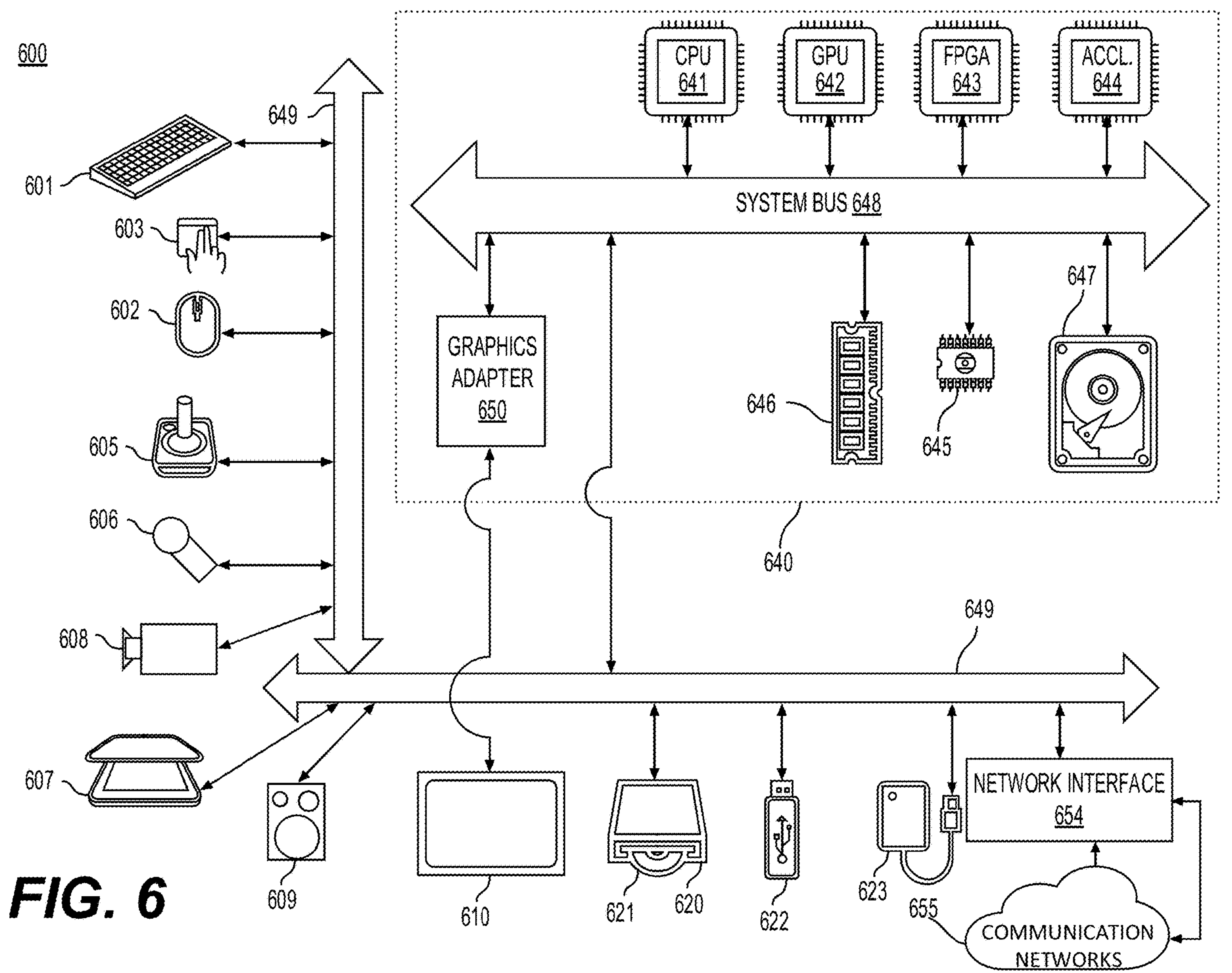
FIG. 6 shows an exemplary computer system according to embodiments of the disclosure.

The components shown in FIG. 6 for computer system (600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (600).

Computer system (600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (601), mouse (602), trackpad (603), touch screen (610), data-glove (not shown), joystick (605), microphone (606), scanner (607), and camera (608).

Computer system (600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (610), data-glove (not shown), or joystick (605), but there can also be tactile feedback devices that do not serve as input devices), audio output devices (such as: speakers (609), headphones (not depicted)), visual output devices (such as screens (610) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (610)) can be connected to a system bus (648) through a graphics adapter (650).

Computer system (600) can also include human accessible storage devices and their associated media such as optical media including CD/DVD ROM/RW (620) with CD/DVD or the like media (621), thumb-drive (622), removable hard drive or solid state drive (623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (600) can also include a network interface (654) to one or more communication networks (655). The one or more communication networks (655) can for example be wireless, wireline, optical. The one or more communication networks (655) can further be local, wide-area, metropolitan, vehicular and industrial, real-time, delay-tolerant, and so on. Examples of the one or more communication networks (655) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example USB ports of the computer system (600)); others are commonly integrated into the core of the computer system (600) by attachment to a system bus as described below (for example Ethernet interface into a PC computer system or cellular network interface into a smartphone computer system). Using any of these networks, computer system (600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (640) of the computer system (600).

The core (640) can include one or more Central Processing Units (CPU) (641), Graphics Processing Units (GPU) (642), specialized programmable processing units in the form of Field Programmable Gate Areas (FPGA) (643), hardware accelerators (644) for certain tasks, graphics adapters (650), and so forth. These devices, along with Read-only memory (ROM) (645), Random-access memory (646), internal mass storage (647) such as internal non-user accessible hard drives, SSDs, and the like, may be connected through the system bus (648). In some computer systems, the system bus (648) can be accessible in the form of one or more physical plugs to enable extensions by additional CPUs, GPU, and the like. The peripheral devices can be attached either directly to the core's system bus (648), or through a peripheral bus (649). In an example, the screen (610) can be connected to the graphics adapter (650). Architectures for a peripheral bus include PCI, USB, and the like.

CPUs (641), GPUs (642), FPGAs (643), and accelerators (644) can execute certain instructions that, in combination, can make up the aforementioned computer code. That computer code can be stored in ROM (645) or RAM (646). Transitional data can be also be stored in RAM (646), whereas permanent data can be stored for example, in the internal mass storage (647). Fast storage and retrieve to any of the memory devices can be enabled through the use of cache memory, that can be closely associated with one or more CPU (641), GPU (642), mass storage (647), ROM (645), RAM (646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (600), and specifically the core (640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (640) that are of non-transitory nature, such as core-internal mass storage (647) or ROM (645). The software implementing various embodiments of the present disclosure can be stored in such devices and executed by core (640). A computer-readable medium can include one or more memory devices or chips, according to particular needs. The software can cause the core (640) and specifically the processors therein (including CPU, GPU, FPGA, and the like) to execute particular processes or particular parts of particular processes described herein, including defining data structures stored in RAM (646) and modifying such data structures according to the processes defined by the software. In addition or as an alternative, the computer system can provide functionality as a result of logic hardwired or otherwise embodied in a circuit (for example: accelerator (644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Figure 7:
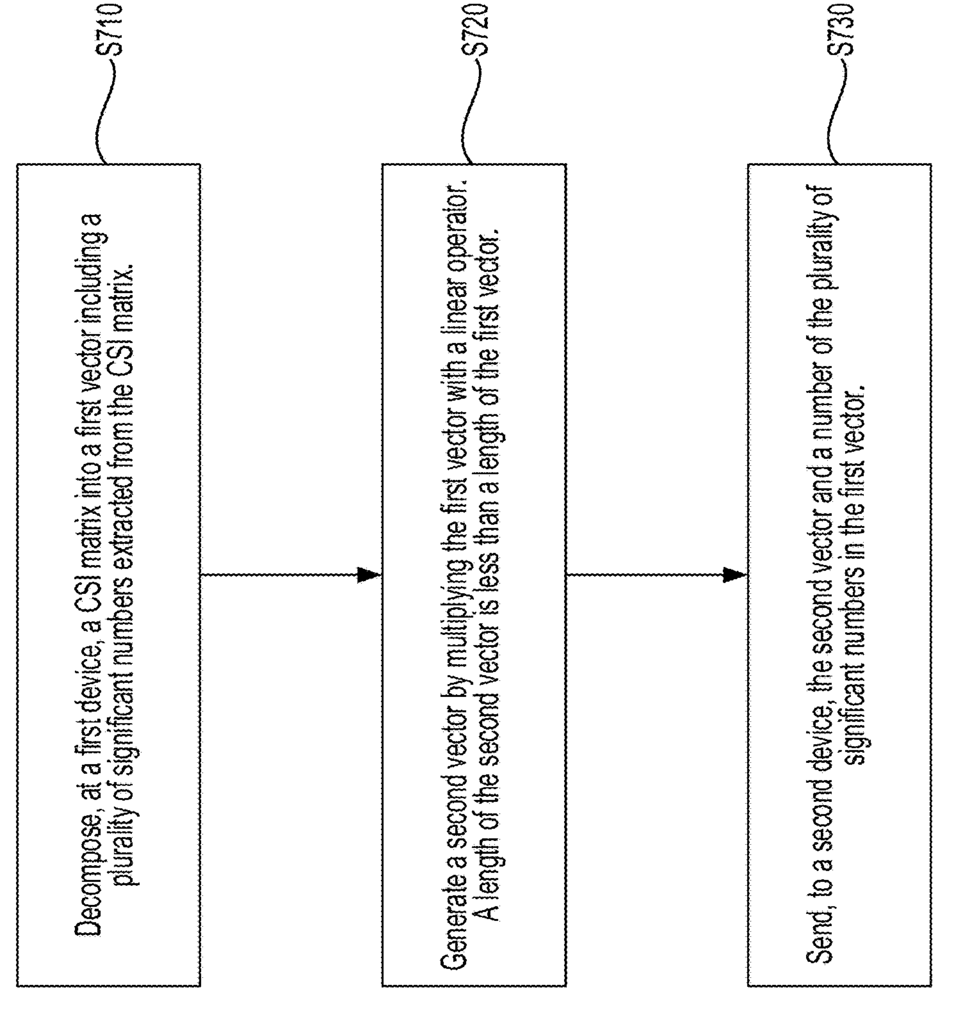
FIG. 7 shows an exemplary process according to embodiments of the disclosure.

FIG. 7 shows an exemplary process 700 according to embodiments of the disclosure. The process 700 can be executed by the processing circuitry 510 of the apparatus 500 for compressing CSI. The process 700 can also be executed by at least one of the CPU 641, the GPU 642, the FPGA 643, or the accelerator 644 of the computer system 600. The process 700 can be implemented in software instructions, and when the processing circuitry 510 or the at least one of the CPU 641, the GPU 642, the FPGA 643, or the accelerator 644 executes the software instructions, the processing circuitry 510 or the at least one of the CPU 641, the GPU 642, the FPGA 643, or the accelerator 644 performs the process 700.

The process 700 may generally start at step 710, where the process 700 decomposes, at a first device, a CSI matrix into a first vector including a plurality of significant numbers extracted from the CSI matrix. Then, the process 700 proceeds to step S720.

At step S720, the process 700 generates a second vector by multiplying the first vector with a linear operator. A length of the second vector is less than a length of the first vector. Then, the process 700 proceeds to step S730.

At step S730, the process 700 sends, to a second device, the second vector and a number of the plurality of significant numbers in the first vector. Then, the process 700 terminates.

In an embodiment, the first vector includes multiple first sub-vectors. The process 700 multiplies each of the multiple first sub-vectors with one of multiple linear operators to obtain a corresponding second sub-vector. Each of the multiple first sub-vectors includes a different subset of the plurality of significant numbers in the first vector. The process 700 sends, to the second device, each second sub-vector and a number of the corresponding subset of the plurality of significant numbers in the first vector.

In an embodiment, a length of each of the multiple first sub-vectors is greater than a length of the second sub-vector generated based on the respective first sub-vector.

In an embodiment, the first vector includes multiple first sub-vectors, the process 700 selects a subset of the multiple first sub-vectors, and multiplies each of the subset of the multiple first sub-vectors with one of multiple linear operators to obtain a corresponding second sub-vector. Each of the subset of the multiple first sub-vectors includes a different subset of the plurality of significant numbers in the first vector. The process 700 sends, to the second device, each second sub-vector and a number of the corresponding subset of the plurality of significant numbers in the first vector.

In an embodiment, a number of the significant numbers in each of the selected subset of the multiple first sub-vectors is equal to each other.

In an embodiment, the linear operator is determined based on the number of the plurality of significant numbers extracted from the CSI matrix.

In an embodiment, the linear operator is a binary party check matrix or a linear block code (LBC).

In an embodiment, a length of the first vector is predetermined.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of compressing channel state information (CSI), the method comprising:

decomposing, at a first device, a CSI matrix into a first vector including a plurality of significant numbers extracted from the CSI matrix;

generating a second vector by multiplying the first vector with a linear operator, a length of the second vector being less than a length of the first vector; and sending, to a second device, the second vector and a number of the plurality of significant numbers in the first vector.

2. The method of claim 1, wherein the first vector includes multiple first sub-vectors, the generating includes multiplying each of the multiple first sub-vectors with one of multiple linear operators to obtain a corresponding second sub-vector, each of the multiple first sub-vectors including a different subset of the plurality of significant numbers in the first vector, and the sending includes sending, to the second device, each second sub-vector and a number of the corresponding subset of the plurality of significant numbers in the first vector.

3. The method of claim 2, wherein a length of each of the multiple first sub-vectors is greater than a length of the second sub-vector generated based on the respective first sub-vector.

4. The method of claim 1, wherein the first vector includes multiple first sub-vectors, the generating includes selecting a subset of the multiple first sub-vectors, and multiplying each of the subset of the multiple first sub-vectors with one of multiple linear operators to obtain a corresponding second sub-vector, each of the subset of the multiple first sub-vectors including a different subset of the plurality of significant numbers in the first vector, and the sending includes sending, to the second device, each second sub-vector and a number of the corresponding subset of the plurality of significant numbers in the first vector.

5. The method of claim 4, wherein a number of the significant numbers in each of the selected subset of the multiple first sub-vectors is equal to each other.

6. The method of claim 1, wherein the linear operator is determined based on the number of the plurality of significant numbers extracted from the CSI matrix.

7. The method of claim 1, wherein the linear operator is a binary parity check matrix or a linear block code (LBC).

8. The method of claim 1, wherein a length of the first vector is predetermined.

9. A non-transitory computer-readable medium storing instructions that, when executed by a processor, cause the processor to perform:

decomposing a compressing channel state information (CSI) matrix into a first vector including a plurality of significant numbers extracted from the CSI matrix;

generating a second vector by multiplying the first vector with a linear operator, a length of the second vector being less than a length of the first vector; and sending, to a second device, the second vector and a number of the plurality of significant numbers in the first vector.

10. The non-transitory computer-readable medium of claim 9, wherein the first vector includes multiple first sub-vectors, the generating includes multiplying each of the multiple first sub-vectors with one of multiple linear operators to obtain a corresponding second sub-vector, each of the multiple first sub-vectors including a different subset of the plurality of significant numbers in the first vector, and the sending includes sending, to the second device, each second sub-vector and a number of the corresponding subset of the plurality of significant numbers in the first vector.

11. The non-transitory computer-readable medium of claim 10, wherein a length of each of the multiple first sub-vectors is greater than a length of the second sub-vector generated based on the respective first sub-vector.

12. The non-transitory computer-readable medium of claim 9, wherein the first vector includes multiple first sub-vectors, the generating includes selecting a subset of the multiple first sub-vectors, and multiplying each of the subset of the multiple first sub-vectors with one of multiple linear operators to obtain a corresponding second sub-vector, each of the subset of the multiple first sub-vectors including a different subset of the plurality of significant numbers in the first vector, and the sending includes sending, to the second device, each second sub-vector and a number of the corresponding subset of the plurality of significant numbers in the first vector.

13. The non-transitory computer-readable medium of claim 12, wherein a number of the significant numbers in each of the selected subset of the multiple first sub-vectors is equal to each other.

14. The non-transitory computer-readable medium of claim 9, wherein the linear operator is determined based on the number of the plurality of significant numbers extracted from the CSI matrix.

15. The non-transitory computer-readable medium of claim 9, wherein the linear operator is a binary parity check matrix or a linear block code (LBC).

16. The non-transitory computer-readable medium of claim 9, wherein a length of the first vector is predetermined.

17. An apparatus, comprising:

processing circuitry configured to:

decompose a compressing channel state information (CSI) matrix into a first vector including a plurality of significant numbers extracted from the CSI matrix;

generate a second vector by multiplying the first vector with a linear operator, a length of the second vector being less than a length of the first vector; and send, to a second apparatus, the second vector and a number of the plurality of significant numbers in the first vector.

18. The apparatus of claim 17, wherein the first vector includes multiple first sub-vectors, and the processing circuitry is configured to:

multiply each of the multiple first sub-vectors with one of multiple linear operators to obtain a corresponding second sub-vector, each of the multiple first sub-vectors including a different subset of the plurality of significant numbers of the first vector; and send, to the second apparatus, each second sub-vector and a number of the corresponding subset of the plurality of significant numbers in the first vector.

19. The apparatus of claim 17, wherein the first vector includes multiple first sub-vectors, and the processing circuitry is configured to:

select a subset of the multiple first sub-vectors; and multiply each of the subset of the multiple first sub-vectors with one of multiple linear operators to obtain a corresponding second sub-vector, each of the subset of the multiple first sub-vectors including a different subset of the plurality of significant numbers of the first vector; and send, to the second apparatus, each second sub-vector and a number of the corresponding subset of the plurality of significant numbers in the first vector.

20. The apparatus of claim 19, wherein a number of the significant numbers in each of the selected subset of the multiple first sub-vectors is equal to each other.

* * * * *